United States Patent
Stirbu et al.

(10) Patent No.: US 9,870,429 B2
(45) Date of Patent: Jan. 16, 2018

(54) METHOD AND APPARATUS FOR WEB-BASED AUGMENTED REALITY APPLICATION VIEWER

(75) Inventors: Vlad Alexandru Stirbu, Tampere (FI); David Joseph Murphy, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 125 days.

(21) Appl. No.: 13/308,083

(22) Filed: Nov. 30, 2011

(65) Prior Publication Data

US 2013/0135344 A1 May 30, 2013

(51) Int. Cl.
G09G 5/00 (2006.01)
G06F 17/30 (2006.01)
(Continued)

(52) U.S. Cl.
CPC .... *G06F 17/30893* (2013.01); *G06F 17/3087* (2013.01); *G09G 5/00* (2013.01); *G06F 3/14* (2013.01); *G06F 21/10* (2013.01); *G06F 2221/032* (2013.01); *G06F 2221/0724* (2013.01); *G06T 1/60* (2013.01); *G06T 11/60* (2013.01); *G06T 15/503* (2013.01); *G09G 3/2003* (2013.01); *G09G 5/02* (2013.01);
(Continued)

(58) Field of Classification Search
CPC .......... G09G 5/14; G09G 2340/10; G09G 2340/125; G06T 11/60; G06T 15/503
USPC ........................................................ 345/629
See application file for complete search history.

(56) References Cited

U.S. PATENT DOCUMENTS 6,563,529 B1 * 5/2003 Jongerius ........... H04N 5/23238
345/629
6,618,053 B1 * 9/2003 Tanner ......................... 345/552
(Continued)

FOREIGN PATENT DOCUMENTS

CN 101149842 A 3/2008
CN 101523432 A 9/2009
(Continued)

OTHER PUBLICATIONS

Build AR, http://buildar.com/, printed from the internet Nov. 30, 2011.
(Continued)

*Primary Examiner* — Abderrahim Merouan
(74) *Attorney, Agent, or Firm* — Ditthavong & Steiner, P.C.

(57) ABSTRACT

An approach is provided for generating web-based augmented reality application viewer. A web-based server application receives a request from a web client for visualization information associated with a web application that renders a perspective-based display. The web-based server application facilitates a processing of the request to execute the web application. One or more web-based server applications at one or more web-based servers cause a generation of one or more images, one or more sequences of the one or more images, or a combination thereof based, at least in part, on the execution of the web application, wherein the one or more images, the one or more sequences, or a combination thereof depict a rendering of a user interface of the web application. The one or more applications transmit the one or more images, the one or more sequences, or a combination thereof as the visualization information for presentation.

18 Claims, 9 Drawing Sheets

(51) Int. Cl.
| | |
|---|---|
| G09G 5/02 | (2006.01) |
| G06T 1/60 | (2006.01) |
| G06F 3/14 | (2006.01) |
| G09G 3/20 | (2006.01) |
| G06F 21/10 | (2013.01) |
| G06T 11/60 | (2006.01) |
| G06T 15/50 | (2011.01) |
| G09G 5/14 | (2006.01) |

(52) U.S. Cl.
CPC ....... *G09G 5/14* (2013.01); *G09G 2300/0452* (2013.01); *G09G 2320/0276* (2013.01); *G09G 2340/10* (2013.01); *G09G 2340/125* (2013.01)

(56) References Cited

U.S. PATENT DOCUMENTS

| | | | | |
|---|---|---|---|---|
| 7,990,394 | B2* | 8/2011 | Vincent | G06T 17/05 345/419 |
| 2003/0160867 | A1 | 8/2003 | Ohio et al. | |
| 2004/0128358 | A1* | 7/2004 | Apfel et al. | 709/206 |
| 2004/0239699 | A1* | 12/2004 | Uyttendaele | G06F 17/30855 715/716 |
| 2004/0250203 | A1* | 12/2004 | Yamada | G06F 17/24 715/219 |
| 2005/0107952 | A1* | 5/2005 | Hoshino | G08G 1/0969 701/431 |
| 2005/0289590 | A1 | 12/2005 | Cheok et al. | |
| 2006/0010100 | A1* | 1/2006 | McAvoy | G06F 17/30241 |
| 2007/0027591 | A1* | 2/2007 | Goldenberg et al. | 701/23 |
| 2007/0273758 | A1* | 11/2007 | Mendoza | G06F 17/3087 348/39 |
| 2008/0033642 | A1 | 2/2008 | Emoto et al. | |
| 2008/0071559 | A1 | 3/2008 | Arrasvuori | |
| 2008/0268876 | A1* | 10/2008 | Gelfand | G06Q 30/02 455/457 |
| 2008/0291217 | A1* | 11/2008 | Vincent | G06T 17/05 345/629 |
| 2009/0005975 | A1* | 1/2009 | Forstall | G01C 21/20 701/533 |
| 2009/0240431 | A1* | 9/2009 | Chau | G01C 21/3647 701/532 |
| 2009/0325607 | A1* | 12/2009 | Conway | G06F 1/1624 455/456.3 |
| 2010/0103075 | A1 | 4/2010 | Kalaboukis et al. | |
| 2010/0131947 | A1* | 5/2010 | Ackley | A63F 13/12 718/1 |
| 2010/0188503 | A1* | 7/2010 | Tsai | G01C 21/20 348/142 |
| 2010/0250136 | A1* | 9/2010 | Chen | G06F 17/30247 701/300 |
| 2011/0258175 | A1 | 10/2011 | Kim et al. | |
| 2011/0279446 | A1* | 11/2011 | Castro | G01C 21/20 345/419 |
| 2011/0289520 | A1* | 11/2011 | Grigoriev | G06F 17/3089 719/331 |
| 2013/0335446 | A1* | 12/2013 | Piippo | G06F 3/04815 345/633 |

FOREIGN PATENT DOCUMENTS

| | | |
|---|---|---|
| CN | 102194007 A | 9/2011 |
| WO | 2008045704 A1 | 4/2008 |
| WO | 2011144793 A1 | 11/2011 |

OTHER PUBLICATIONS

Google Maps, http://maps.google.com/, printed from the Internet Nov. 30, 2011.
Google Street View, http://maps.google.com/intl/en/help/maps/streetview/#utm_campaign=en&utm_medium=van&utm_source=en-van-na-us-gns-svn, printed from the internet Nov. 30, 2011.
Nokia Ovi Maps, http://api.maps.ovi.com/, printed from the internet Nov. 30, 2011.
International Search Report and Written Opinion received in corresponding Patent Cooperation Treaty Application No. PCT/FI2012/051004, dated Apr. 19, 2013. 16 pages.
Office Action for corresponding Chinese Patent Application No. 2012800587861, dated Jun. 21, 2016, 12 pages, English Language Summary Included.
Extended European Search Report for corresponding European Application No. 12853773.5-1952 dated Jun. 23, 2015, 6 pages.
Office Action for corresponding Chinese Patent Application No. 201280058786.1, dated Feb. 8, 2017, English Language Summary Included, 13 pages.
Office Action for corresponding European Patent Application No. 12 853 773.5-1952, dated Feb. 22, 2017, 9 pages.
Office Action for corresponding Chinese Patent Application No. 201280058786.1, dated Aug. 15, 2017, English Language Summary Included, 13 pages.

\* cited by examiner

METHOD AND APPARATUS FOR WEB-BASED AUGMENTED REALITY APPLICATION VIEWER

BACKGROUND

Service providers (e.g., wireless, cellular, etc.) and device manufacturers are continually challenged to deliver value and convenience to consumers by, for example, providing compelling network services. In particular, these services can include location and navigation services on a mobile device (e.g., a smartphone). For example, mobile devices may include a display, location-based sensors (e.g., Global Positioning System (GPS) receivers), camera, and a processor, along with access to network-based databases of information. In addition, such devices can be programmed to provide a virtual view of geographic places or points of interest (POIs) and other objects via methods such as augmented reality, virtual reality, three-dimensional mapping, and/or other similar perspective displays. However, obtaining and processing the required information suitable for viewing in a user device requires significant processing power and resources. Accordingly, service providers and device manufacturers face significant technical challenges for enabling applications and services that support perspective-based displays to present POIs or other objects so that users can more easily request, receive and view an augmented reality presentation. These challenges can be particularly acute on mobile devices where display, computing, memory, and/or other resources may be limited.

SOME EXAMPLE EMBODIMENTS

Therefore, there is a need for an approach for providing an efficient web-based augmented reality application viewer.

According to one embodiment, a method comprises determining a request from a web client for visualization information associated with a web application that renders a perspective-based display. The method also comprises processing and/or facilitating a processing of the request to cause, at least in part, an execution of the web application at a service that is remote to the web client. The method further comprises causing, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. Furthermore, the method comprises causing, at least in part, a transmission of the one or more images, the one or more sequences, or a combination thereof as the visualization information to the web client.

According to another embodiment, an apparatus comprising at least one processor, and at least one memory including computer program code, the at least one memory and the computer program code configured to, with the at least one processor, cause, at least in part, the apparatus to determine a request from a web client for visualization information associated with a web application that renders a perspective-based display. The apparatus is also caused to process and/or facilitate a processing of the request to cause, at least in part, an execution of the web application at a service that is remote to the web client. The apparatus is further caused to cause, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. Furthermore, the apparatus is caused to cause, at least in part, a transmission of the one or more images, the one or more sequences, or a combination thereof as the visualization information to the web client.

According to another embodiment, a computer-readable storage medium carrying one or more sequences of one or more instructions which, when executed by one or more processors, cause, at least in part, an apparatus to determine a request from a web client for visualization information associated with a web application that renders a perspective-based display. The apparatus is also caused to process and/or facilitate a processing of the request to cause, at least in part, an execution of the web application at a service that is remote to the web client. The apparatus is further caused to cause, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. Furthermore, the apparatus is caused to cause, at least in part, a transmission of the one or more images, the one or more sequences, or a combination thereof as the visualization information to the web client.

According to another embodiment, an apparatus comprises means for determining a request from a web client for visualization information associated with a web application that renders a perspective-based display. The apparatus also comprises means for processing and/or facilitating a processing of the request to cause, at least in part, an execution of the web application at a service that is remote to the web client. The apparatus further comprises means for causing, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. Furthermore, the apparatus comprises means for causing, at least in part, a transmission of the one or more images, the one or more sequences, or a combination thereof as the visualization information to the web client.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for a web-based augmented reality application viewer are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "perspective display" refers to a user interface or a portion of a user interface for presenting location-based information in a three-dimensional (3D) representation or an approximation of a 3D representation. By way of example, perspective displays are used in applications supporting augmented reality, virtual reality, mapping, navigation, and the like. Although various embodiments are described with respect to a mapping display that is an augmented reality display, it is contemplated that various embodiments of the approach described herein may be used with any other type of perspective display.

Figure 1:
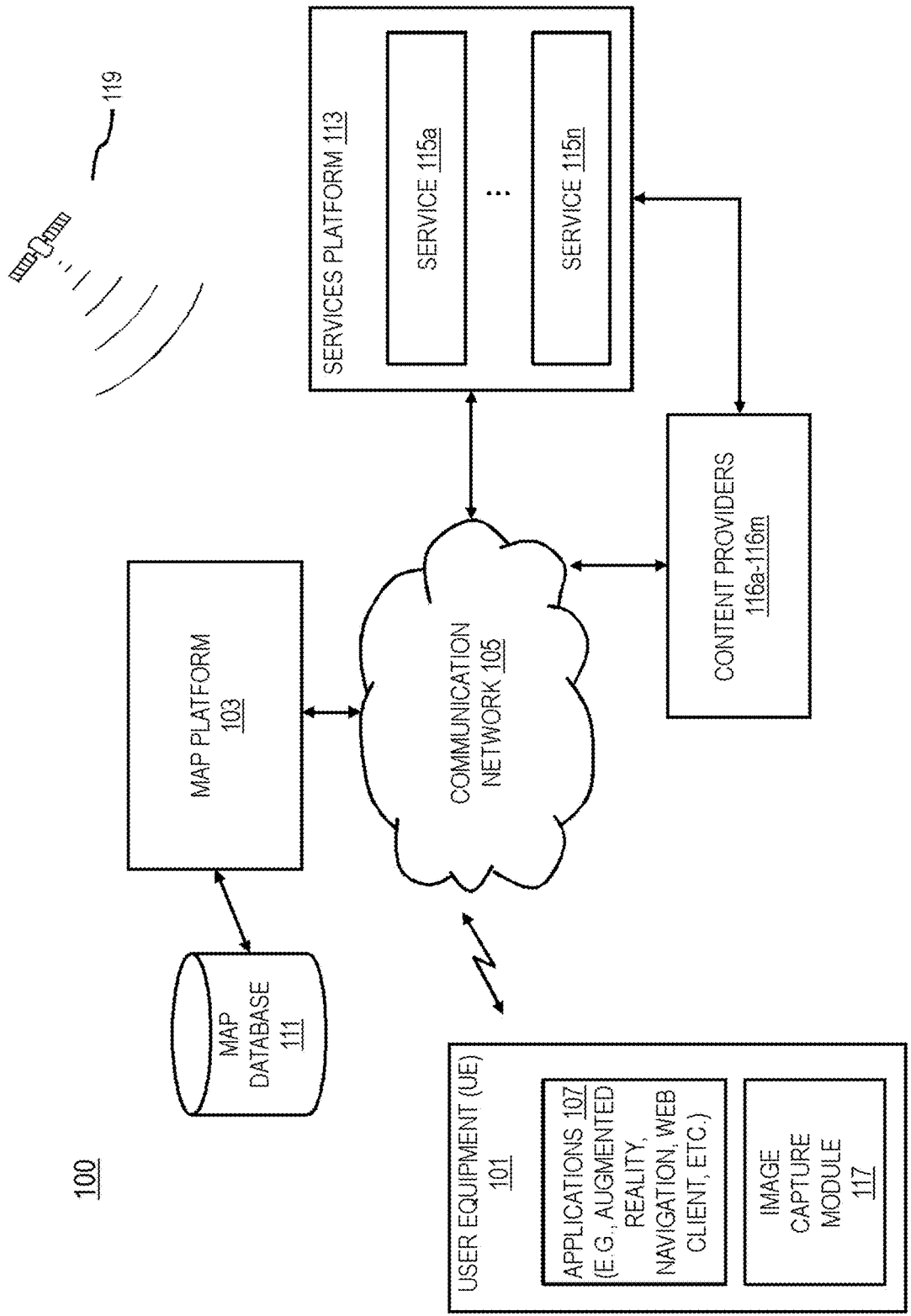
FIG. 1 is a diagram of a system capable of generating a web-based perspective display for displaying at a user device, according to one embodiment.

FIG. 1 is a diagram of a system capable of generating a web-based perspective display for displaying at a user device, according to one embodiment. It is becoming increasingly popular for service providers and device manufacturers to bundle or make available navigation and mapping services on an array of user devices (e.g., mobile handsets, computers, navigation devices, etc.). Such devices may utilize location-based technologies (e.g., Global Positioning System (GPS) receivers, cellular triangulation, assisted-GPS (A-GPS), etc.) to provide navigation and mapping information. One growing trend for these services is to move beyond two-dimensional (2D) maps and provide location services based on three-dimensional (3D) maps or representations of locations, objects, points and/or routes of interest utilizing augmented reality (AR) and mixed reality (MR) technologies. Further, as map applications become more of an intuitive way of visualizing geographic tagged content, AR content creation services are increasingly allowing users to create AR content by clicking where to position one or more objects/contents on a map. These placed objects (e.g., virtual objects) can then be rendered for a user viewing the corresponding area or location via an AR application or other perspective-based display application. For example, modern devices may utilize an AR mode to superimpose graphics and text over video and/or images showing points of interest (POIs) and content at a location identified by a user. Moreover, certain devices may utilize perspective-based displays such as 3D representations (e.g., rendered 3D models) of objects, buildings and streets to provide navigational, mapping, or other location-based information.

However, as previously discussed, such perspective-based renderings can be complex and resource intensive for a user device to generate. For example, one or more AR applications on a user device can require various data types (e.g., object models, texture data, mapping data, sensor data, etc.) from a range of different sources (e.g., local resources, network resources, content providers, etc.) for rendering. In addition, displays that include many objects, complex textures, etc. can require significant processing time to render which can introduce latency. This latency can be particularly problematic when positioning objects within a perspective display (e.g., when creating AR content) where dynamic renderings can be used to preview the objects.

Accordingly, because of the resource constraints, current map applications (e.g. mashups using Google Maps© or Nokia Maps©) utilize a 2D visualization representation wherein geo tagged content is overlaid on a map background. However, as map databases increasingly include 3D content (e.g. 3D building models or terrain data), the 2D visualization representation can have limitations, for example, in creating AR content where merely displaying a pin on a map representing the content does not provide sufficient support for a near real-world previewing of contents at the geo-location indicated by the content creator and/or a user. Ideally, a preview should be generated showing how the content may look placed in a real-world location on a map using a 3D rendering. For example, entities that create digital content can visualize how the content may look at a given physical location without the need to have their own visualization capabilities. In another example, a user may wish to preview in AR one or more content items placed at a physical location in a mapping application. Further, in a user device based AR solution, the required data may be of various formats and may be distributed over a communication network (e.g., web-based/cloud-based) wherein the user device may not have access to sufficient network bandwidth, network speed, processing power, battery power and required various software applications and algorithms.

Therefore, service providers and device manufacturers face the problem of providing a solution for rendering a real-time or substantially real-time perspective-based display at a user device based on user defined parameters.

To address this problem, a system 100 of FIG. 1 introduces the capability of generating a perspective display (e.g., an AR display) by efficiently obtaining and processing mapping and content information for generating a perspective display for browser-based applications and devices which may not have required resources and capabilities to perform the required processes at a user device. For example, a web-based service can generate/render a 3D visualization of a physical location and the contents according to one or more user defined parameters utilizing, at least in part, one or more remote web-based services (e.g., service providers, web servers, etc.) for rendering a perspective display. Further, the web-based services may access one or more required resources (e.g., applications, servers, databases, etc.), define and/or access one or more contents (e.g., via one or more uniform resource identifiers (URI)), and execute one or more required applications and/or algorithms for generating a perspective display of the physical location including the one or more contents for presentation at a user device. More specifically, in one embodiment, the system 100 includes a browser and a collection of servers (e.g. Mashup Servers, Content Servers, City Scene Server, Maps Server, etc.) and service providers that provide one or more web applications, mapping information, terrain information, 3D models for buildings and textures (e.g. from a maps server), and content to be displayed on the map. Further, a dedicated network server can run one or more AR and/or ME applications on one or more servers within the network. The dedicated server can provide one or more APIs that allow clients (e.g. web browsers and native clients) to request visualizations of content provided by content servers using one or more dedicated applications wherein a user may view a screen capture or a video stream that can be displayed by the client.

In one embodiment, a network server (e.g., a web server) application determines a request from a web client (e.g., at a user device) for visualization information associated with a web application that renders a perspective-based display, wherein the request is generated by a selection of one or more options in a user interface presented at the web client on the user device. For example, a user utilizes an application (e.g., a mapping application) on the user device to submit a request to one or more services for a preview (e.g., AR) of a physical location which may comprise one or more contents.

In another embodiment, the network server application processes and/or facilitates a processing of the request to cause, at least in part, an execution of the web application at a service that is remote to the web client wherein the execution of the web application is based, at least in part, on one or more parameters specified in the request. For example, a web server (e.g., cloud-based, web-based) receives the request from the user device, submits the request for execution to one or more services and/or executes one or more portions of the request at the receiving server. In various embodiments, the execution of the request may cause the executing server to request further information items (e.g., images, content, texture, mapping information, user device information, etc.) from the user and/or from other servers within the network. In other embodiments, the execution of the web application is based, at least in part, on one or more parameters specified in the request. For example, the one or more parameters may include one or more object models, one or more locations of the one or more object models, one or more viewing locations, user information, user device information, URI information or a combination thereof for rendering by the web application. In another example, a user may submit the one or more object models from a local or remote storage.

In various embodiments, the network server application causes, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. For example, a user may request for a preview of a content item at a physical location on a map wherein for generating the preview, the server application may access one or more images of the content item along with other information associated (e.g., at a local storage device) and/or request from one or more other servers. Further, one or more information items associated with the physical location indicated in the user request may be accessed and/or requested for. Furthermore, a preview (e.g., AR, MR, etc.) including one or more images and/or a sequence of one or more images along with location information are rendered for presentation at the user device via a user interface (UI) application wherein information related to the UI and user device are included in the user request. Moreover, the user request and the required information for generating the preview may be processed by one or more servers and applications available in the network.

In another embodiment, the network server application causes, at least in part, a transmission of the one or more images, the one or more sequences, or a combination thereof as the visualization information to the web client. For example, a server application may present an AR rendering to the web client on the user device wherein the user may interact with the rendering via the UI on the user device, for instance, to remove an object, add an object, move an object, change view angle, change granularity, add information items to an object and the like. In another example, multiple parts of the rendering may be transmitted to the web client on the user device wherein the web client integrates the multiple parts to present a final rendering at the user device. In another example, the presentation can be defined to extend beyond the visible range of a particular display (e.g., extend to a 360 degree representation of the specified location around a viewing location), wherein the user can interact with the display to view different aspects of the presentation.

In various embodiments, the generation of the one or more images, the one or more sequences, or a combination thereof is based, at least in part, on display capability information, viewport information, or a combination thereof associated with the web client. For example, a user device executing a web client has one or more display capabilities wherein the capability information (e.g., width and height) may be included in the user request for the preview. In another embodiment, a user device allows a user to select a display option available on the user device. In another embodiment, a preview is generated such that a web client can adjust one or more parameters in the preview for rendering on the user device and presenting to the user via one or more application at the user device.

In another embodiment, the network server application determines the one or more viewing locations based, at least in part, on path information specified, at least in part, in the request. For example, a user may indicate a path (e.g., a street), instead of a fixed position, along which the one or more images, the one or more sequences of images and/or a video stream is to be presented in the preview.

In another embodiment, the network server application processes and/or facilitates a processing of the request to determine content information. In one example, a web server receives the request from the user (e.g., user device) and determines what is specified in the request. Further, the web server can determine the content information specified in the request and can ascertain location of the content and/or associated information with the content. In another example, a user request includes one or more URIs for the content. In another example, the user provides the one or contents (e.g., images) along with the user request.

In another embodiment, the network server application causing, at least in part, a rendering of the content information in the user interface, the one or more images, the one or more sequences, or a combination thereof. For example, one or more applications on one or more network servers can provide one or more information items associated with the one or more content items identified by the user. In another example, information items associated with a content item may be collected from one or more sources (e.g., web servers) and presented in the preview at the user device.

In various embodiments, the network server application processes and/or facilitates a processing of the one or more images, the one or more sequences, or a combination thereof to cause, at least in part, a generation of one or more user interaction elements. In certain examples, a web server requests and receives the one or more images and/or one or more associated information items from one or more sources (e.g., other web servers) and determines one or more interaction elements for presentation to the user via the web client on the user device. For example, the user can select and move a content item from one location on a map to another location on the map. In another example, a user can add a new content item on the map.

In various embodiments, the network server application causes, at least in part, a grouping of the one or more user interaction elements with the one or more images, the one or more sequences, or a combination thereof. In certain examples, the server application can determine; for example, based on user defined parameters, user device capabilities, available interaction options, web client options, etc.; one or more interaction elements and associate them with the one or more images for presentation to the user. In another embodiment, the one or more user interaction elements include, at least in part, one or more asynchronous scripting elements wherein the script allows the presentation of the rendering to continue to be processed and will process a reply from the web server when it is received. Further, the one or more asynchronous scripting elements include, at least in part, a tiling of the one or more images, the one or more sequences, or a combination thereof for supporting, at least in part, scrolling, panning, zooming, or a combination thereof. For example, asynchronously processing one or more interaction elements (e.g., zooming) in rendering of the preview can avoid delays while retrieval of one or more elements from the server is still being processed since the user can continue to interact with the presentation and the remaining requested content/information can be processed when a response from the web server is received.

In yet another embodiment, following the rendering of a perspective display and the mapping of the representations of the objects onto a mapping application, the system 100 and/or the web client can use, for instance, orientation information associated with the user device (e.g., a compass heading) to select a portion of the rendering in the perspective display of a location-based user interface based on a viewing location and perspective. For example, direction information is combined with information on the angle of view of the camera to select a portion of the rendering to display. Further, if the compass heading or information changes but the location (e.g., latitude and longitude) of the device remains the same, the system 100 and/or the web client can select a new portion of the rendering to display that corresponds to the new orientation information. For example, in an AR display, the system 100 displays a live camera view of the surrounding location and supplements the live image with information (e.g., pictures, media, text labels, descriptions, etc.) relevant to each object in a real time manner. The viewpoint for providing the AR display is dependent on, for instance, where the user's device is pointed as determined by the device's location, directional heading, and tilt angle. Accordingly, as the user moves the device, the view in the AR display and the displayed objects change dynamically based on the movement.

By way of example, proposed methods herein can provide advantages including reduced communication network traffic; little or no processing at the user device; battery life savings at the user device (e.g., especially on mobile devices) and no (e.g., fully capable) AR application needed on user devices. Further, any required augmented reality applications (e.g. City Scene) can be centrally updated at web/cloud servers without a need to distribute the applications to clients/user devices. Furthermore, AR content can be previewed substantially more completely than using a maps-only solution.

As noted previously, the mapping display of the system 100 is not limited to AR displays and may include other types of mapping displays such as augmented virtuality display (e.g., using 3D models to represent real world locations and object/POI information), conventional 3D maps, and/or any other display of perspective-based mapping, location, or navigation information. As used herein, in certain embodiments, mapping, location, and navigation information (collectively referred to herein as mapping information) refers to information about the user's location (e.g., map coordinates), other locations (e.g., destinations, objects, POIs), relationships between locations (e.g., directions for travelling between the locations, relative positions of the locations, associations between the locations), and the like.

As shown in FIG. 1, a user equipment (UE) 101 may request a perspective display of one or more objects/contents (e.g., POI information, content information, 3D maps) located at a physical location from one or more services; for example, a map platform 103, services platform 113, via a communication network 105. The mapping information may be utilized by the services platform 113, content providers 116a-116m (also collectively known as content providers 116) applications 107 on the UE 101 (e.g., an augmented reality application 107, a navigation application 107, web client 107, etc.) or a combination thereof. The applications 107 may also include a display manager 109 to generate and/or assist in generating perspective displays as discussed with respect to various embodiments described herein for use or presentation by the applications 107. Moreover, the content, POI or other item information to be included in the perspective display may be included in a map database 111 associated with the map platform 103 for access by the, services platform 113, the content providers 116, the applications 107. In certain embodiments, content, POI and other related information are information that may be utilized by one or more service providers and/or the AR application 107 for display to the user. As discussed previously, content and POI information may also include or be associated with maps, satellite images, street and path information, signing information associated with maps, objects and structures associated with the maps, information about people and the locations of people, places of interest, associated metadata, coordinate information associated with the information, three-dimensional models of the environment, etc., or a combination thereof. Further, content or POI can be a specific object or a point location that a person may, for instance, find interesting or useful. Examples of objects or points-of-interest can include an airport, a bakery, a dam, a landmark, a restaurant, a hotel, the location of a person, or any point interesting, useful, or significant in some way. Furthermore, POIs may also include virtual objects/artifacts that can be visualized only in AR and/or MR applications wherein examples of such virtual artifacts can include virtual billboards, virtual signs, virtual moving objects (e.g., trucks, cars, planes, trains, etc.) and the like that may display one or more images and/or advertisements.

In certain embodiments, POI information may be associated with content information including live media (e.g., streaming broadcasts), stored media (e.g., stored on a network or locally), metadata associated with media, text information, location information of other user devices, or a combination thereof. The content may be provided by the services platform 113 which includes one or more services 115a-115n (e.g., web services, web servers, mashup servers/hosting, storage, music service, mapping service, video service, social networking service, content broadcasting service, etc.), the content providers 116 (e.g., online content retailers, public databases, etc.), other content source available or accessible over the communication network 105. For example, a mashup server or host can provide services and applications for combining data, presentations or functionalities from multiple sources to create new and/or different forms of the data, presentations and functionalities. In another example, the services platform 113 and/or applications 107 may display location-related content information (e.g., content associated with a POI or with a particular location) in the perspective display in addition or as an alternate to the POI information.

In one embodiment, an image capture module 117 of the UE 101 may be utilized in conjunction with the AR application 107 to present location information (e.g., mapping and POI information) to the user. For example, the user may be presented with an AR interface associated with the AR application 107 or the navigation application 107 that presents mapping information (e.g., POI information), content information, and the like on a mapping display. In certain embodiments, the user interface may display a hybrid physical and virtual environment where 3D objects from the map database 111 are placed superimposed on top of a live (e.g., via a camera of the UE 101) or pre-recorded image (e.g., a 360° panoramic picture) of a corresponding location. In another embodiment, the mapping information and the maps presented to the user may be a simulated 3D environment in place of or in addition to the live augmented reality display. Accordingly, the web client application 107 can operate on the AR mapping display, the simulated 3D display, and/or other perspective displays to select items and related information (e.g., POI information, location-related content information) presented therein.

As noted, the UE 101 may execute one or more of the applications 107 to view or access POI information. As mentioned above, the mapping information may include POI information, location information, directions or associations to a location, or a combination thereof. In one example, a default setting may allow the user to view information about POIs associated with locations, structures, and other objects associated with an AR display or 3D environment. For example, a user of the UE 101 may utilize a web browser application to request a perspective display of a geographical location including one or more objects and POIs. Further, one or more web servers at one or more service providers such as the services platform 113, the map platform 103 and content providers 116 can provide web applications (e.g. at a mashup server), maps tiles, terrain information, 3D models for buildings and textures (e.g. Maps Server), and content to be displayed on a map application. In one embodiment, one or more web servers (e.g., a server farm) at the services platform 113 can run one or more AR/MR applications for rendering a perspective display of a geographical location and one or more objects, POIs and/or contents. The services platform 113 can present an API that allows clients (e.g. web browsers and native clients) to request visualizations of content provided by content providers 116 utilizing one or more applications, wherein the perspective display is a screen capture or a video stream that can be displayed by the web client at the user device.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, map platform 103, and services platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the augmented reality or navigation application 107 and the map platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
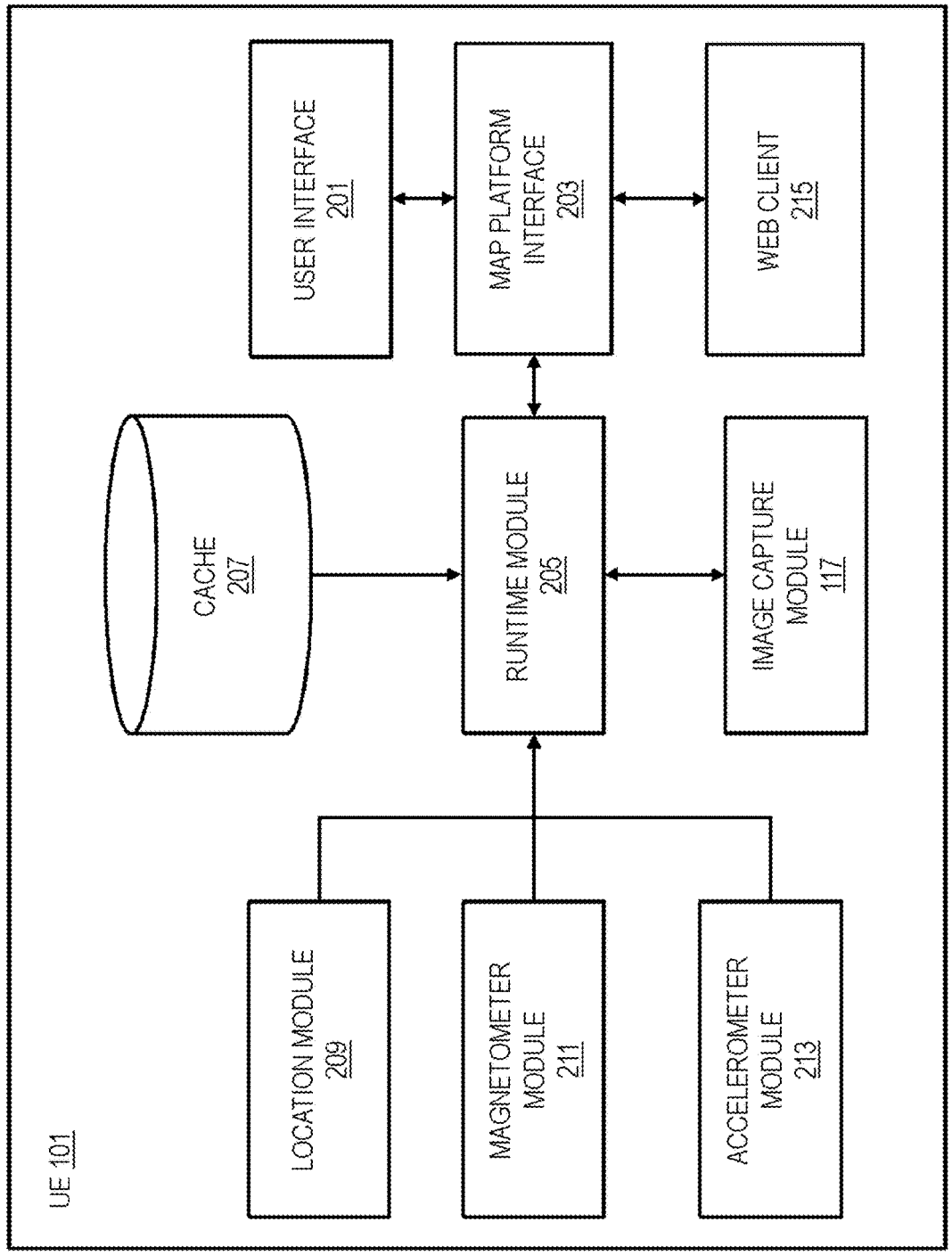
FIG. 2 is a diagram of the components of a user equipment capable of requesting, receiving and presenting a perspective display of a geo-location including one or more objects/contents, according to one embodiment.

FIG. 2 is a diagram of the components of a user equipment capable of requesting, receiving and presenting a perspective display of a geo-location including one or more objects/contents, according to one embodiment. By way of example, the UE 101 includes one or more components for requesting, receiving and presenting a perspective display of a geo-location including one or more objects/contents as discussed in various embodiments of the approach described herein. It is contemplated that the functions of these components may be combined in one or more components or performed by other components of equivalent functionality. In this embodiment, the UE 101 includes a user interface 201 to present a perspective display including, for instance, POI information; a web client 215 to receive a complete or one or segments of a perspective display from the services platform 113, the map platform 103, and/or the content providers 116; a runtime module 205 for executing one or more applications (e.g., AR application 107, navigation application 107, web client application 107, etc.); a cache 207 to locally store one or more segments of a perspective display, POI information and/or related content information; a location module 209 to determine a location of the UE 101; a magnetometer module 211 to determine horizontal orientation or directional heading (e.g., a compass heading) of the UE 101; an accelerometer module 213 to determine vertical orientation or an angle of elevation of the UE 101; and an image capture module 117.

The perspective display may be presented to the user via the user interface 201, which may include various methods of communication. For example, the user interface 201 can have outputs including a visual component (e.g., a screen), an audio component (e.g., a verbal instructions), a physical component (e.g., haptic feedback), and other methods of communication. User inputs can include a touch-screen interface, microphone, camera, a scroll-and-click interface, a button interface, etc. Further, the user may input a request to start an application 107 (e.g., an AR, a web client or a navigation application) and utilize the user interface 201 to receive a perspective display including POI and/or other mapping information. Through the user interface 201, the user may request different types of content, mapping, or location information to be presented. Further, the user may be presented with 3D or AR representations of particular locations and related objects (e.g., buildings, terrain features, POIs, etc. at the particular location) as part of a graphical user interface on a screen of the UE 101.

The map platform interface 203 is used by the runtime module 205 to communicate with the map platform 103. In some embodiments, the interface is used to fetch POI information and/or related content, mapping, and or location information from the map platform 103, services platform 113, and/or content providers 116. The UE 101 may utilize requests in a client server format to retrieve the POI and/or mapping information. Moreover, the UE 101 may specify location information and/or orientation information in the request to retrieve the POI and/or mapping information. The location module 209, magnetometer module 211, accelerometer module 213, and image capture module 117 may be utilized to determine location and/or orientation information used in determining along which the direction the UE 101 is pointed (e.g., the viewpoint of the UE 101) so that POI and related information corresponding to the pointed direction can be retrieved. Further, this POI and mapping information may be stored in the cache 207 to be utilized in generating a perspective display at the UE 101.

In one embodiment, the location module 209 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 209 may also utilize multiple technologies to detect the location of the UE 101. GPS coordinates can provide finer detail as to the location of the UE 101. As previously noted, the location module 209 may be utilized to determine location coordinates for use by the application 107 and/or the map platform 103.

The magnetometer module 211 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which geographic feature, object, or POI) the UE 101 is pointing towards. This information may be utilized to select a first person view to render the perspective display.

Further, the accelerometer module 213 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 213 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint to provide POI and mapping information to the user. As such, this information may be utilized in selecting available POI and/or other items to present information to the user. Moreover, the combined information may be utilized to determine portions of a particular 3D map or augmented reality view that may interest the user. In one embodiment, if the location information associated with one or more available POI items does not correspond to the viewpoint (e.g., is not visible in the selected viewpoint), one or more indicators (e.g., arrows or pointers) may be shown on the user interface to indicate the direction towards the location of the POI items.

In another embodiment, the user may manually input any one or more of the location, directional heading, and tilt angle to specify a viewpoint for displaying the user interface on the UE 101 instead of determining the viewpoint from the sensors. In this way, the user may select a "virtual viewpoint" to be a place other than the current location and pointing direction of the UE 101.

Images for supporting a graphical user interface can be captured using the image capture module 117. The image capture module 117 may include a camera, a video camera, a combination thereof, etc. In one embodiment, visual media is captured in the form of an image or a series of images. The image capture module 117 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve POI and mapping information from the map cache 207 or the map platform 103. In certain embodiments, the cache 207 includes all or a portion the information in the map database 111.

Figure 3:
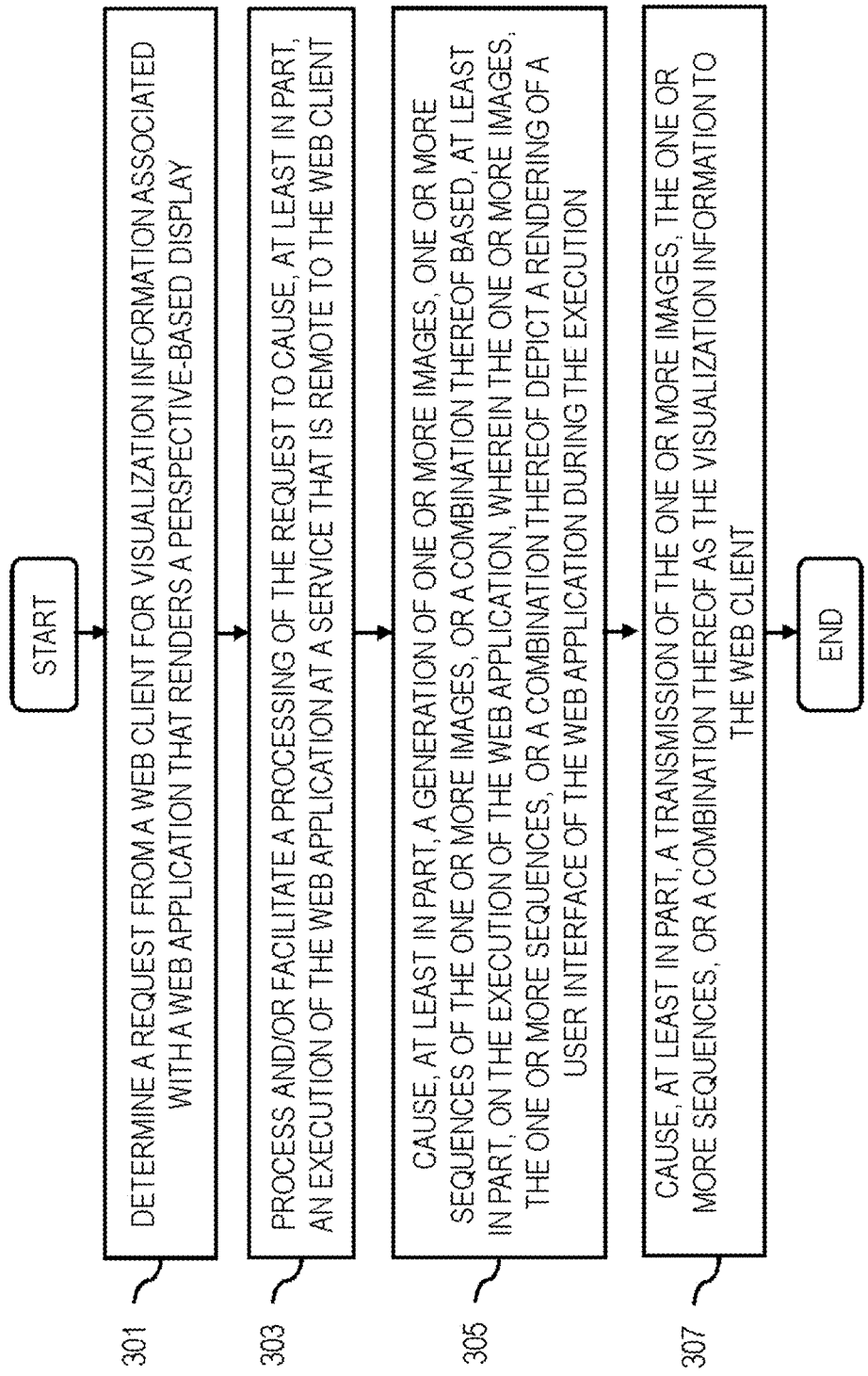
FIG. 3 is a flowchart for determining a request and associated parameters for a web-based perspective display, according to one embodiment.

FIG. 3 is a flowchart of a process for determining a request and associated parameters for a web-based perspective display, according to one embodiment. In various embodiments, the runtime module 205 and/or the services platform 113 perform all or parts of the process 300 and are implemented in, for instance, a chip set including a processor and a memory as shown FIG. 7. In certain embodiments, the services platform 113 may perform some or all of the steps of the process 300 and communicate with the UE 101 using a client server interface. For example, the UE 101 may activate applications 107 for requesting and displaying a perspective display from the services platform 113. Moreover, the applications 107 may execute upon the runtime module 205.

In step 301, the services platform 113 determines a request from a web client (e.g., from a user device) for visualization information associated with a web application that renders a perspective-based display, wherein the request is generated by a selection of one or more options in a user interface presented at the web client on the user device. For example, a user may utilize applications 107 (e.g., a mapping application) on the user device to submit a request to one or more services for a preview (e.g., AR) of a physical location which may comprise one or more contents. In another example, the UE 101 may utilize a location module 209, magnetometer module 211, accelerometer module 213, or a combination thereof to determine a viewpoint of the user as previously discussed. In other embodiments, the user may select the viewpoint based on a 3D environment. The user may select the viewpoint based on conventional means of searching a map or 3D map (e.g., by selecting a starting point and traversing the map or entering location coordinates, such as GPS coordinates or an address, of the viewpoint). Furthermore, in various embodiments, the generation of the one or more images, the one or more sequences, or a combination thereof is based, at least in part, on display capability information, viewport information, or a combination thereof associated with the web client. For example, a user device executing a web client has one or more display capabilities wherein the capability information (e.g., width and height) may be included in the user request for the preview. In another embodiment, a user device allows a user to select a display option available on the user device. In another embodiment, a preview is generated such that a web client can adjust one or more parameters in the preview for rendering on the user device and presenting to the user via one or more application at the user device.

In step 303, the services platform 113 processes and/or facilitates a processing of the request to cause, at least in part, an execution of the web application at a service that is remote to the web client, wherein the execution of the web application is based, at least in part, on one or more parameters specified in the request. For example, a web server (e.g., cloud-based, web-based) receives the request from the user device, submits the request for execution to one or more services and/or executes one or more portions of the request at the receiving server. In various embodiments, the execution of the request may cause the executing server to request further information items (e.g., images, content, texture, mapping information, user device information, etc.) from the user and/or from other servers within the network. In other embodiments, the execution of the web application is based, at least in part, on one or more parameters specified in the request. For example, the one or more parameters may include one or more object models, one or more locations of the one or more object models, one or more viewing locations, user information, user device information, URI information or a combination thereof for rendering by the web application.

In step 305, the services platform 113 causes, at least in part, a generation of one or more images, one or more sequences of the one or more images, or a combination thereof based, at least in part, on the execution of the web application, wherein the one or more images, the one or more sequences, or a combination thereof depict a rendering of a user interface of the web application during the execution. For example, a user may request for a preview of a content item at a physical location on a map wherein for generating the preview, the server application may access one or more images of the content item along with other information associated (e.g., at a local storage device) and/or request from one or more other servers. Further, one or more information items associated with the physical location indicated in the user request may be accessed and/or requested for. Furthermore, a preview (e.g., AR, MR, etc.) including one or more images and/or a sequence of one or more images along with location information are rendered for presentation at the user device via a user interface (UI) application wherein information related to the UI and user device are included in the user request. Moreover, the user request and the required information for generating the preview may be processed by one or more servers and applications available in the network.

In step 307, the services platform 113 causes, at least in part, a transmission of the one or more images, the one or more sequences, or a combination thereof as the visualization information to the web client. For example, a server application may present an AR rendering to the web client on the user device wherein the user may interact with the rendering via the UI on the user device, for instance, to remove an object, add an object, move an object, change view angle, change granularity, add information items to an object and the like. In another example, multiple parts of the rendering may be transmitted to the web client on the user device wherein the web client integrates the multiple parts to present a final rendering at the user device. In another example, the presentation can be defined to extend beyond the visible range of a particular display (e.g., extend to a 360 degree representation of the specified location around a viewing location), wherein the user can interact with the display to view different aspects of the presentation.

As previously noted, the perspective display can represent a physical environment, which may be captured using an image capture module 117 of the UE 101 to provide an AR display. In another embodiment, the image may represent a virtual 3D environment, where the user's location in the real world physical environment is represented in the virtual 3D environment. In the representation, the viewpoint of the user is mapped onto the virtual 3D environment. Moreover, a hybrid physical and virtual 3D environment may additionally be utilized to present navigational information to the user. The AR application 107 may determine what mapping information to present based on user preferences or other system parameters or settings (e.g., a default setting).

In certain embodiments, the mapping information includes one or more objects/POIs (e.g., a coffee shop, a bridge, a billboard, a tree, a building) that the user is searching for or wishes to include in the AR presentation. In other embodiments, the perspective display may also include navigational information such as a directional indicator to a location that the user is searching for (e.g., a friend, a particular POI, etc.). The location can be determined by querying the map platform 103, which may include location information for POIs and additionally may be capable of tracking the movement of people using dynamic positioning technology (e.g., by detecting the presence of a user via GPS information). Further, locations of the user (e.g., the user device) and the objects/POIs to be presented in the perspective display can be stated in relation to one another. For example, an object which is to be presented in the perspective display can be specified to be placed within a certain distance from the user (e.g., at a 500 feet diameter from the user), wherein the distance can be varied by the user and/or maintained at a fixed distance even if the user location changes (e.g., in the real world or on the map).

Figure 4:
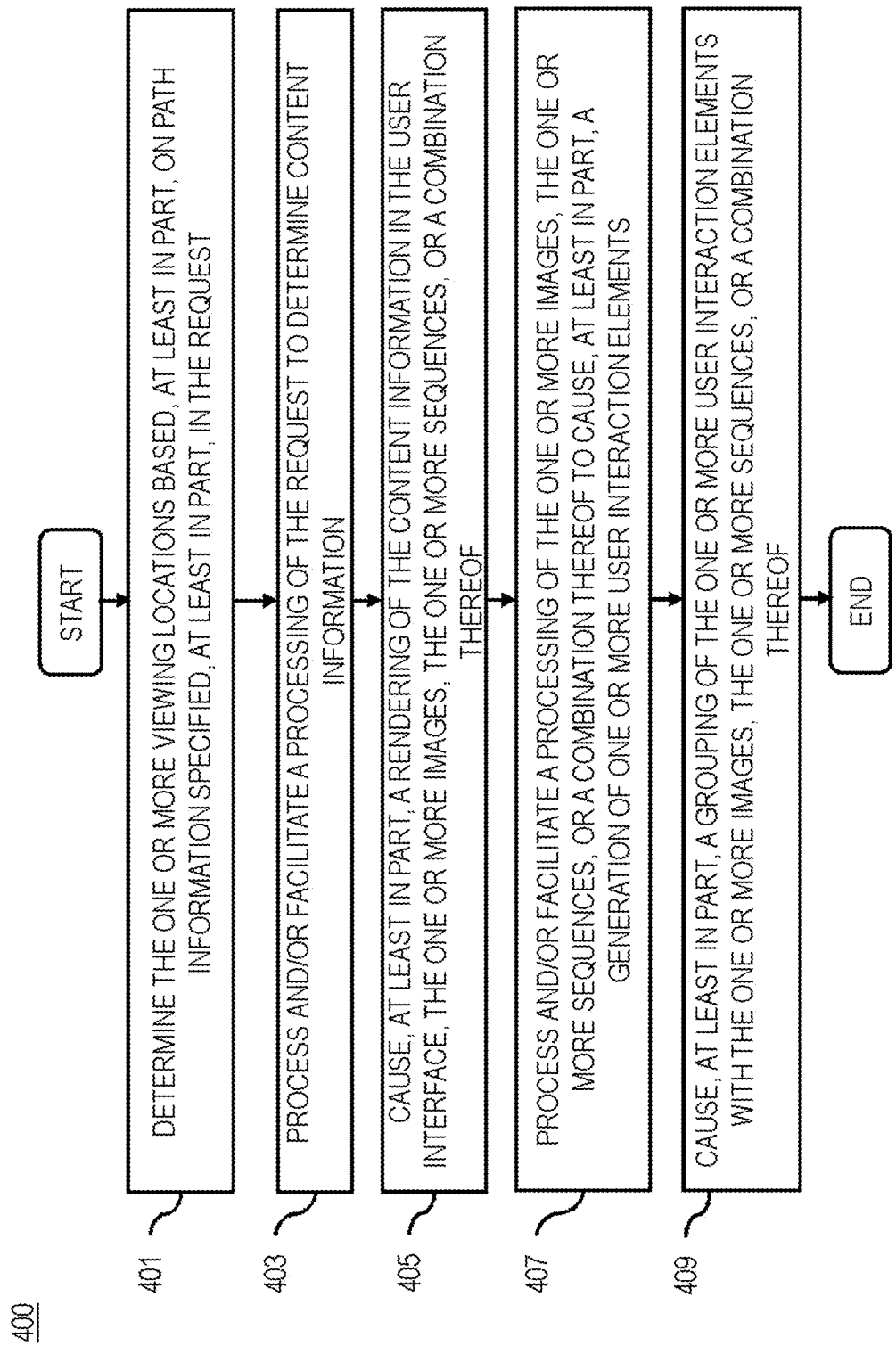
FIG. 4 is a flowchart of a process for an efficient web-based augmented reality application viewer, according to one embodiment.

FIG. 4 is a flowchart of a process for an efficient web-based augmented reality application viewer, according to one embodiment. In various embodiments, the runtime module 205 and/or the services platform 113 perform all or parts of the process 400 and are implemented in, for instance, a chip set including a processor and a memory as shown FIG. 7. In certain embodiments, the services platform 113 may perform some or all of the steps of the process 400 and communicate with the UE 101 using a client server interface. For example, the UE 101 may activate applications 107 for requesting and displaying a perspective display from the services platform 113. Moreover, the applications 107 may execute upon the runtime module 205.

In step 401, the services platform 113 and/or the applications 107 determine the one or more viewing locations based, at least in part, on path information specified, at least in part, in the request. For example, a user may indicate a path (e.g., a street), instead of a fixed position, along which the one or more images, the one or more sequences of images and/or a video stream is to be presented in the preview.

In step 403, the services platform 113 processes and/or facilitates a processing of the request to determine content information. In one example, a web server receives the request from the user (e.g., user device) and determines what is specified in the request. Further, the web server can determine the content information specified in the request and can ascertain location of the content and/or associated information with the content. In another example, a user request includes one or more URIs for the content. In another example, the user provides the one or contents (e.g., images) along with the user request.

In step 405, the services platform 113 and/or the applications 107 causes, at least in part, a rendering of the content information in the user interface, the one or more images, the one or more sequences, or a combination thereof. For example, one or more applications on one or more network servers can provide one or more information items associated with the one or more content items identified by the user. In another example, information items associated with a content item may be collected from one or more sources (e.g., web servers) and presented in the preview at the user device.

In step 407, the services platform 113 and/or the applications 107 process and/or facilitate a processing of the one or more images, the one or more sequences, or a combination thereof to cause, at least in part, a generation of one or more user interaction elements. In certain examples, a web server requests and receives the one or more images and/or one or more associated information items from one or more sources (e.g., other web servers) and determines one or more interaction elements for presentation to the user via the web client on the user device. For example, the user can select and move a content item from one location on a map to another location on the map. In another example, a user can add a new content item on the map.

In step 409, the services platform 113 and/or the applications 107 causes, at least in part, a grouping of the one or more user interaction elements with the one or more images, the one or more sequences, or a combination thereof. In certain examples, the server application can determine; for example, based on user defined parameters, user device capabilities, available interaction options, web client options, etc.; one or more interaction elements and associate them with the one or more images for presentation to the user. In another embodiment, the one or more user interaction elements include, at least in part, one or more asynchronous scripting elements wherein the script allows the presentation of the rendering to continue to be processed and will process a reply from the web server when it is received. Further, the one or more asynchronous scripting elements include, at least in part, a tiling of the one or more images, the one or more sequences, or a combination thereof for supporting, at least in part, scrolling, panning, zooming, or a combination thereof. For example, asynchronously processing one or more interaction elements (e.g., zooming) in rendering of the preview can avoid delays while retrieval of one or more elements from the server is still being processed since the user can continue to interact with the presentation and the remaining requested content/information can be processed when a response from the web server is received.

Figure 5A:
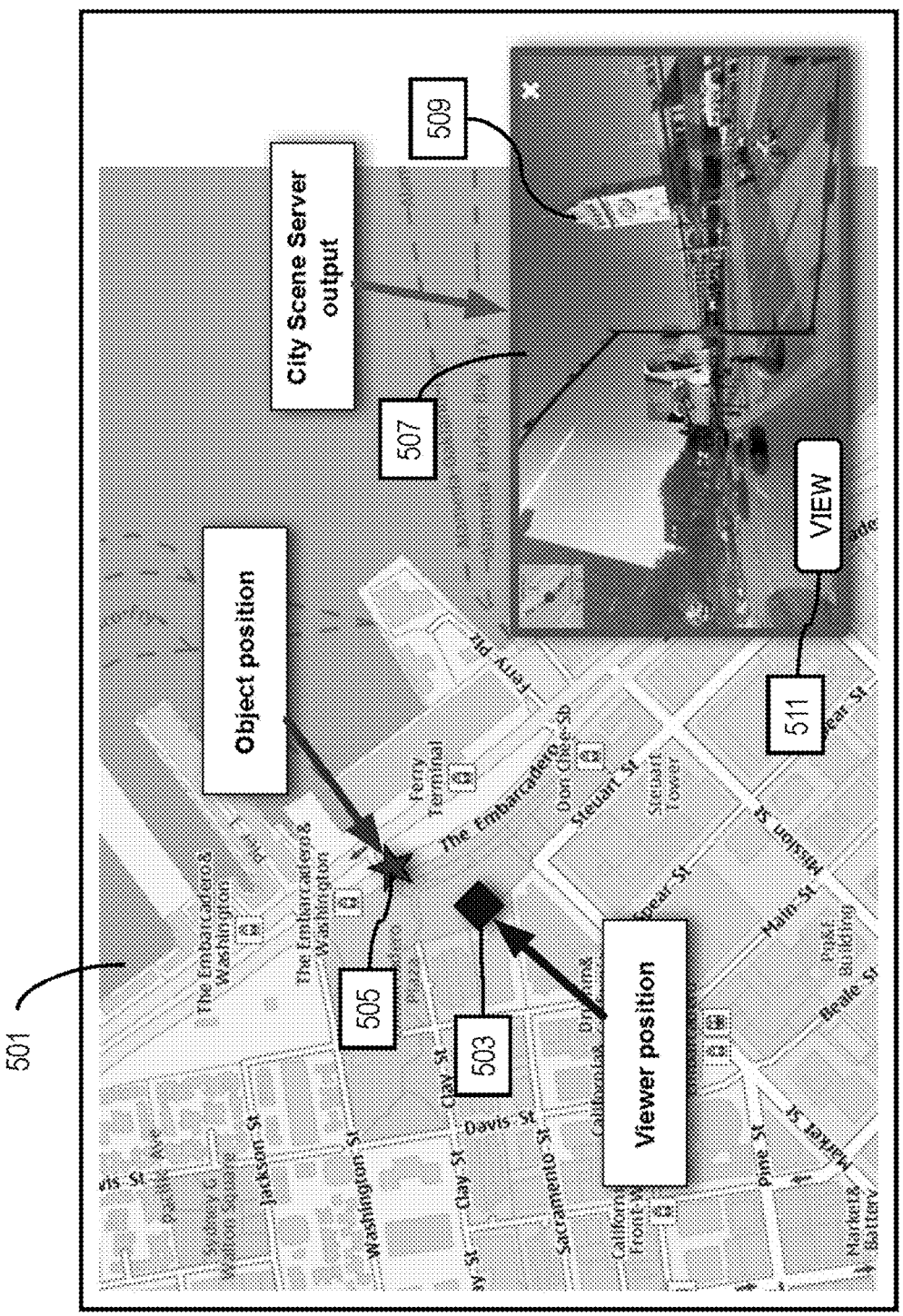
FIGS. 5A and 5B are diagrams of user interfaces depicting perspective display renderings at a user device, according to various embodiments.
Figure 5B:
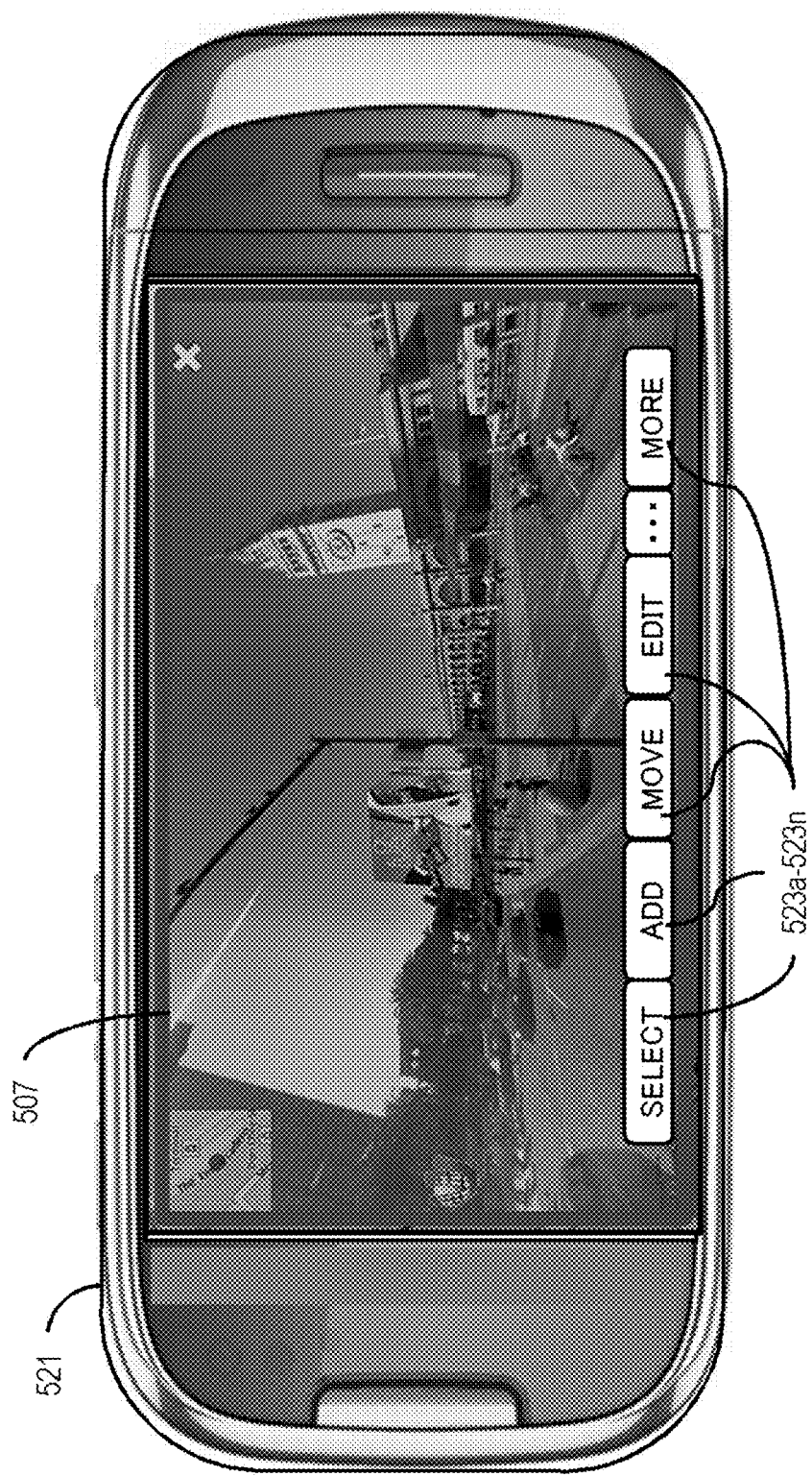

FIGS. 5A and 5B are diagrams of user interfaces depicting perspective display renderings at a user device, according to various embodiments. FIG. 5A represents a rendering of a map view 501 where a viewer position 503 may be a user location or a location indicated by the user and an object position 505 indicated by one or more parameters submitted by the user, the services platform 113 and/or the content providers 116. Further, a perspective display 507 is a presentation of the location (e.g., user location) including a rendering of an object/content 509 provided by the user and/or the content providers 116 wherein the perspective display 507 may be viewed separate from the map by, for example, selecting to 511 view option. FIG. 5B shows a UI 521 wherein the perspective display 507 is presented separately in the UI and wherein a user may select from one or more options 523a-523n, or other UI menu options, for interacting with the objects, contents and/or POIs presented in the display; for example, move, add, remove, etc.; included in the perspective display. For example, a user may select from a range of available objects/POIs (e.g., from local and/or remote storage, from the internet, etc.) and introduce into the perspective display. In another example, additional objects/content may become available as the user location and/or the perspective view location change. In another embodiment, a user and/or the services platform 113 may identify and/or select one or more user devices with various user device capabilities so that one or more possible perspective display renderings for each user device may be previewed, examined, evaluated, pre-screened, selected and/or the like.

The processes described herein for providing an efficient web-based augmented reality application viewer may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
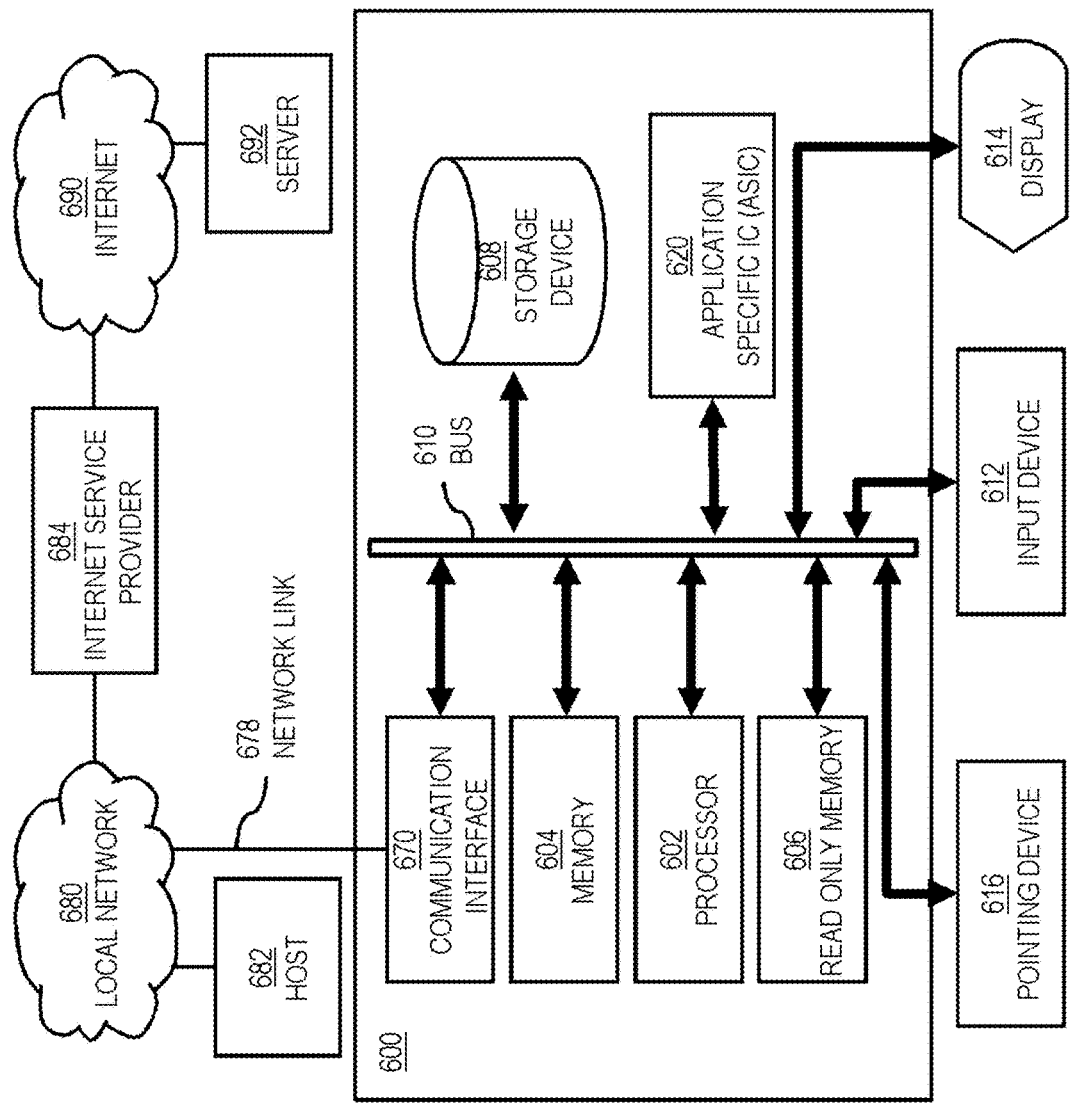
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide an efficient web-based augmented reality application viewer as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing an efficient web-based augmented reality application viewer. A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to providing an efficient web-based augmented reality application viewer. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (NOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing an efficient web-based augmented reality application viewer. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing an efficient web-based augmented reality application viewer is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing an efficient web-based augmented reality application viewer.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
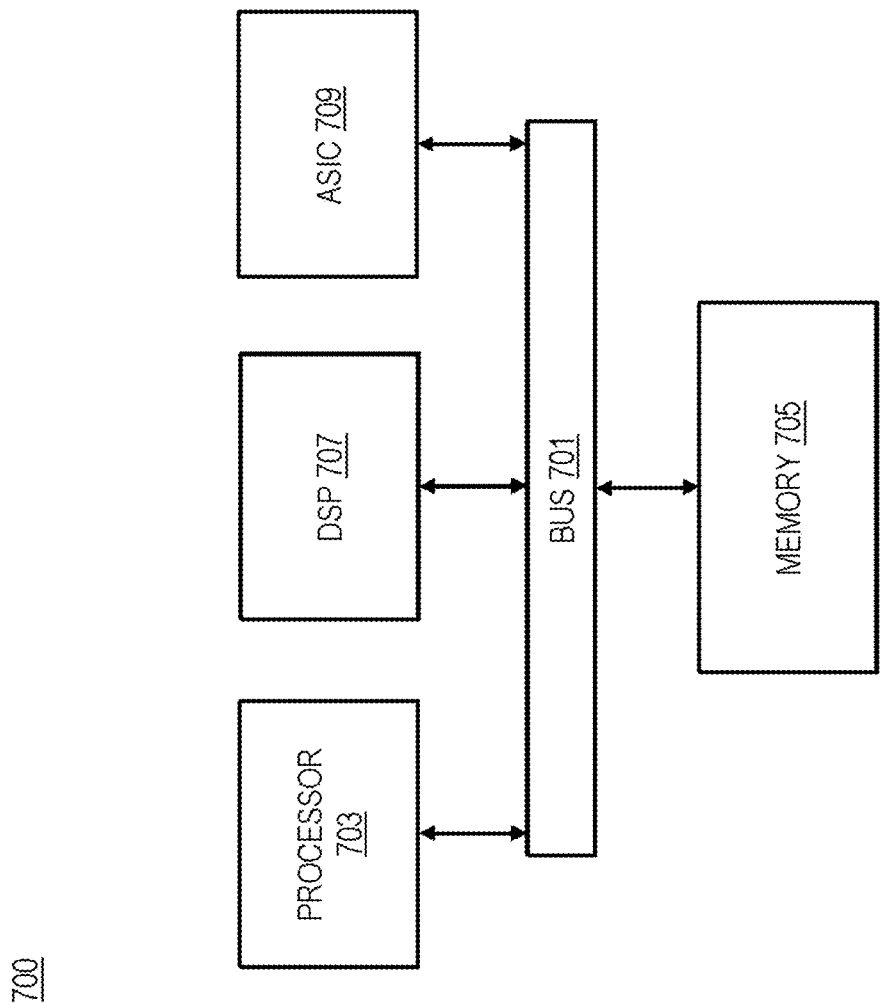
FIG. 7 is a diagram of a chip set that can be used to implement an embodiment of the invention.

FIG. 7 illustrates a chip set or chip 700 upon which an embodiment of the invention may be implemented. Chip set 700 is programmed to provide an efficient web-based augmented reality application viewer as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing an efficient web-based augmented reality application viewer.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide an efficient web-based augmented reality application viewer. The memory 705 also stores the data associated with or generated by the execution of the inventive steps.

Figure 8:
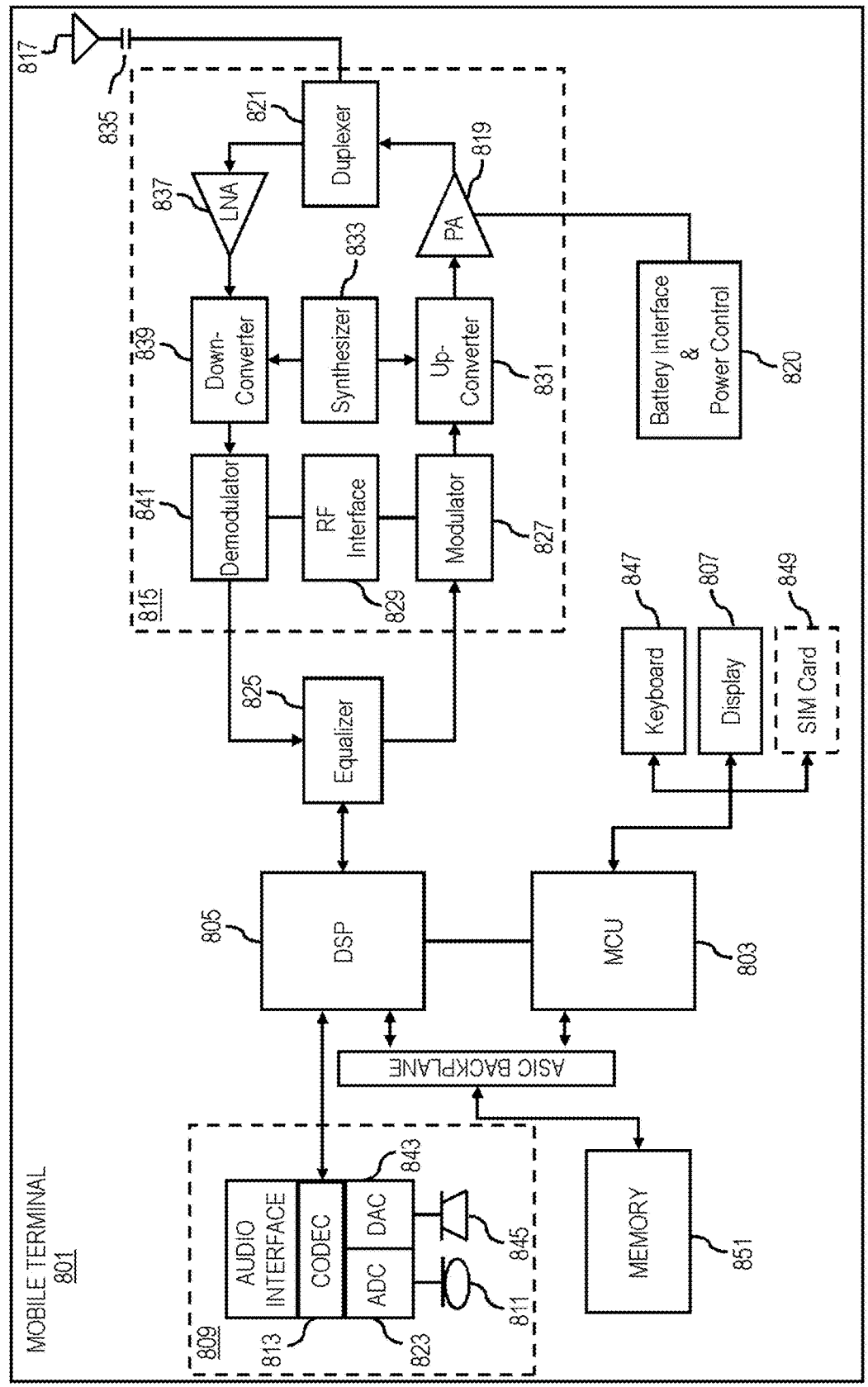
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for providing an efficient web-based augmented reality application viewer. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing an efficient web-based augmented reality application viewer. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide an efficient web-based augmented reality application viewer. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, by an apparatus via a network, a request from a web client on a user device for visualization information associated with a web application that renders a perspective-based display of a geographic area that identifies a position of the web client and a position of at least one object, and content;
processing, by the apparatus, the request to cause an execution of the web application based, at least in part, on one or more parameters specified in the request, wherein the one or more parameters indicate the position of the at least one object and one or more viewing locations for viewing the at least one object, wherein the one or more viewing locations are different from the position of the user device, and wherein the position of the web client, the position of at least one object, and the one or more viewing locations are identified on a map displayed within in the perspective-based display;
simulating, by the apparatus, one or more image sequences showing the at least one object viewed from the one or more viewing locations as in a physical world, wherein the one or more image sequences are augmented into a rendering of a user interface of the web application; and
initiating, by the apparatus, a transmission of the one or more image sequences as the visualization information viewed from the one or more viewing locations via the network to the user device.

2. A method of claim 1, further comprising:
determining the one or more viewing locations based, at least in part, on a movement along at least one travel path specified in the request; and
initiating a generation of a preview of the perspective-based display of the geographic area including the at least one object viewed from the one or more viewing locations using virtual reality,
wherein the one or more image sequences depict a rendering of the user interface of the web application along the at least one travel path in a real time manner with the movement.

3. A method of claim 2,
wherein the one or more parameters include, at least in part, one or more object models, one or more locations of the one or more object models, one or more viewing locations, or a combination thereof for rendering by the web application.

4. A method of claim 2, further comprising:
initiating an adjustment of the preview, in response to the one or more parameters as updated via the web client,
processing the request to determine content information associated with the content; and
initiating a rendering of the content information in the user interface, together with the one or more images, the one or more sequences, or a combination thereof.

5. A method of claim 1, wherein the generation of the one or more images, the one or more sequences, or a combination thereof is based, at least in part, on display capability information, viewport information, or a combination thereof associated with the web client, and wherein one or more user interface menu options are available for interacting with the at least one object, the content, or a combination thereof.

6. A method of claim 1, further comprising:
processing the one or more images, the one or more sequences, or a combination thereof to cause, at least in part, a generation of one or more user interaction elements; and
grouping the one or more user interaction elements with the one or more images, the one or more sequences, or a combination thereof,
wherein the one or more images include one or more three dimensional simulated images.

7. A method of claim 6, wherein the one or more user interaction elements include, at least in part, one or more asynchronous scripting elements, wherein the one or more three dimensional simulated images are augmented into the user interface in place of or in addition to a live camera view.

8. A method of claim 7, wherein the one or more asynchronous scripting elements include, at least in part, a tiling of the one or more images, the one or more sequences, or a combination thereof for supporting, at least in part, scrolling, panning, zooming, or a combination thereof, and wherein a user may select from one or more user interface menu options for interacting with the at least one object, content, or combination thereof.

9. A method of claim 1, wherein the request is generated by a selection of one or more options in a user interface presented at the web client, wherein one or more user interface menu options are selected for interacting with the at least one object, the content, or a combination thereof.

10. An apparatus comprising:
at least one processor; and
at least one memory including computer program code for one or more programs, the at least one memory and the computer program code configured to, with the at least one processor, cause the apparatus to perform at least the following,
receive, via a network, a request from a web client on a user device for visualization information associated with a web application that renders a perspective-based display of a geographic area that identifies a position of the web client and a position of at least one object, and content;
process the request to cause an execution of the web application based, at least in part, on one or more parameters specified in the request, wherein the one or more parameters indicate the position of the at least one object and one or more viewing locations for viewing the at least one object, wherein the one or more viewing locations are different from the position of the user device, and wherein the position of the web client, the position of at least one object, and the one or more viewing locations are identified on a map displayed within in the perspective-based display;
simulate one or more image sequences showing the at least one object viewed from the one or more viewing locations as in a physical world, wherein the one or more image sequences are augmented into a rendering of a user interface of the web application; and
initiate a transmission of the one or more image sequences as the visualization information viewed from the one or more viewing locations via the network to the user device.

11. An apparatus of claim 10, wherein the apparatus is further caused to:

determine the one or more viewing locations based, at least in part, on a movement along at least one travel path specified in the request; and
initiating a generation of a preview of the perspective-based display of the geographic area including the at least one object viewed from the one or more viewing locations using virtual reality,
wherein the one or more image sequences depict a rendering of the user interface of the web application along the at least one travel path in a real time manner with the movement.

12. An apparatus of claim 11, wherein the one or more parameters include, at least in part, one or more object models, one or more locations of the one or more object models, one or more viewing locations, or a combination thereof for rendering by the web application.

13. An apparatus of claim 10, wherein the apparatus is further caused to:
process the request to determine content information; and
initiate a rendering of the content information in the user interface, the one or more images, the one or more sequences, or a combination thereof.

14. An apparatus of claim 10, wherein the generation of the one or more images, the one or more sequences, or a combination thereof is based, at least in part, on display capability information, viewport information, or a combination thereof associated with the web client, and wherein a user may select from one or more user interface menu options for interacting with the at least one object, content, or combination thereof.

15. An apparatus of claim 10, wherein the apparatus is further caused to:
process the one or more images, the one or more sequences, or a combination thereof to cause, at least in part, a generation of one or more user interaction elements; and cause, at least in part, a grouping of the one or more user interaction elements with the one or more images, the one or more sequences, or a combination thereof.

16. An apparatus of claim 15, wherein the one or more user interaction elements include, at least in part, one or more asynchronous scripting elements.

17. An apparatus of claim 16, wherein the one or more asynchronous scripting elements include, at least in part, a tiling of the one or more images, the one or more sequences, or a combination thereof for supporting, at least in part, scrolling, panning, zooming, or a combination thereof, and wherein a user may select from one or more user interface menu options for interacting with the at least one object, content, or combination thereof.

18. An apparatus of claim 10, wherein the request is generated by a selection of one or more options in a user interface presented at the web client, and wherein one or more user interface menu options are selected for interacting with the at least one object, the content, or a combination thereof.

* * * * *